United States Patent
Buehler et al.

(10) Patent No.: US 6,296,920 B1
(45) Date of Patent: Oct. 2, 2001

(54) REVERSIBLE THERMOTROPIC PLASTICS MOLDING COMPOUND, METHOD FOR ITS MANUFACTURE AND ITS UTILIZATION

(75) Inventors: Friedrich Buehler, Thusis; Manfred Hewel, Rodels, both of (CH)

(73) Assignee: EMS-Chemie AG (CH)

( * ) Notice: Subject to any disclaimer, the term of this patent is extended or adjusted under 35 U.S.C. 154(b) by 0 days.

(21) Appl. No.: 09/385,656

(22) Filed: Aug. 27, 1999

(30) Foreign Application Priority Data

Sep. 9, 1998 (DE) .............................. 198 41 234

(51) Int. Cl.$^7$ .............................. B32B 5/00; C08L 77/00
(52) U.S. Cl. .............................. 428/98; 524/81; 524/113; 524/284; 524/297; 524/366; 524/442; 524/539; 524/543; 525/185; 525/191; 525/398; 525/420; 525/437; 525/440; 525/450; 428/101; 428/141; 428/221; 428/357; 428/411.1; 428/474.4; 428/480
(58) Field of Search .............................. 524/81, 113, 284, 524/297, 366, 442, 539, 543, 185; 525/191, 398, 420, 437, 440, 450; 428/98, 101, 141, 221, 357, 411.1, 474.4, 480

(56) References Cited

U.S. PATENT DOCUMENTS 5,156,709 * 10/1992 Mammino et al. .................. 156/235
5,731,389 * 3/1998 Bailly et al. ......................... 525/437

FOREIGN PATENT DOCUMENTS

| 42 19 438 A1 | 12/1993 | (DE) . |
| 197 00 064 A1 | 7/1997 | (DE) . |
| 197 19 224 A1 | 11/1997 | (DE) . |
| WO 97/25357 | 7/1997 | (WO) . |
| WO 97/25358 | 7/1997 | (WO) . |

OTHER PUBLICATIONS

Helen Rose Wilson and Wolfgang Eck; Transmitssion Variation Using Scattering/Transparent Switching Films; Solar Energy Materials and Cells 31 (1993) 197–214.

* cited by examiner

Primary Examiner—Samuel A. Acquah
(74) Attorney, Agent, or Firm—Marshall & Melhorn, LLC

(57) ABSTRACT

The invention relates to a reversible thermotropic plastics molding compound. Thermotropic molding compounds of this kind are used, amongst other things, for glass and coverings for shading and light/heat regulation in houses, cars, etc. The molding compound according to the invention consists of two compounds which are not thermodynamically miscible with one another. The first component consists of a plastics material, while the second component is not liquid-crystalline and has a refractive index which is the same as the first component in the transparent range and the temperature dependency of which is different from the temperature dependency of the refractive index of the first component. On raising the temperature, the transmission of the molding compound is thus altered.

28 Claims, No Drawings

REVERSIBLE THERMOTROPIC PLASTICS MOLDING COMPOUND, METHOD FOR ITS MANUFACTURE AND ITS UTILIZATION

BACKGROUND OF THE INVENTION

1. Field of the Invention

The present invention relates to a reversible thermotropic plastics molding compound, to a method for its manufacture and to its utilization. Plastics molding compounds of this kind are needed for shading systems for regulating the amount of light and the temperature. They can be used in particular for the glazing of buildings, greenhouses, cars, solar collecting systems and the like.

2. Description of the Prior Art

According to prior art, the following systems are used for thermotropic glazing of this kind. From DE 19 719 224 A1, WO 9725358 A1 and WO 9725357 A1 it is known that thermotropic gels are introduced between two sheets of glass, the thermotropic gels separating with increasing temperature, forming thus scattering centers and thus reducing the light transmission. As they cool, the thermotropic gels mix with one another again and the scattering centers disappear, as a result of which the transmission increases again. What is disadvantageous about this system is the fact that the diffusion processes occurring in the hydrogel during the separation and mixing are slow, such that only low transition times can be achieved. Furthermore, hydrogels of this kind cannot be processed thermoplastically and themselves have none of the usual functional properties for plastics.

Furthermore liquid crystals embedded in polymers are known from Solar Energie Mater. Sol. Cells (1993) volume 31, pages 197 to 214. In a similar manner, in Proc. SPIE. Int. Soc, Opt. Eng. (1992) volume 1728, pages 261 to 271, films are described which have been manufactured from liquid crystals of this type embedded in polymer. In this case, the desired thermotropic effect is based on an alteration in the structure of the liquid-crystalline phase at a corresponding temperature. Since the molecular re-arrangement of the liquid-crystalline phase is hindered with increasing viscosity of the environment, those systems also have long transition times. Furthermore, liquid-crystalline polymers of this kind are expensive materials with complex structures, which are difficult to process and which have a negative influence on the mechanical properties of the matrix polymer.

From DE 38 31 873 A1 are known mixtures of thermotropic liquid-crystalline polymers, polycarbonate and polyester. The disadvantage of these mixtures consists in the fact that the liquid-crystalline polymers, as a result of the rigid anisotropic segments, are hard and brittle, and thus have a negative effect on the toughness of glass manufactured from same.

OBJECT OF THE INVENTION

The object of the present invention is, therefore, to make available reversible thermotropic molding compounds, methods for manufacturing same and uses of such plastics molding compounds, which can be realized in a simple and inexpensive manner without the listed disadvantages of prior art.

This object is achieved by the thermotropic transparent molding compound according to claim 1, the method according to claim 23 and the uses according to claim 26. Advantageous developments of the plastics molding compound, method and uses according to the invention, are given in the dependent claims.

DESCRIPTION OF THE PREFERRED EMBODIMENT

The thermotropic transparent molding compound according to the invention consists of two components, the first component consisting of a transparent plastics material. The second component consists of material which is not thermodynamically miscible with the first component and is therefore available within the working temperature always in a separate phase from the first component. This second component has a dependence of the refractive index on temperature which is different from the dependence of the first component. If the temperature of the molding compound is increased, the refractive index of the second component changes in a different way from the refractive index of the first component, and the transparency of the molding compound is reduced. With this principle, a new way of generating thermotropism of the whole molding compound comprising the first and second component becomes available, which is not based on diffusion processes nor does it require complicated liquid-crystalline polymers with suitable nematic transition, and which thus renders possible a greater choice of second components, since the latter does not have to be liquid-crystalline.

The thermotropism of the molding compound according to the invention is reversible and has short transition times, since no rearrangement of crystals or separating/mixing processes occur.

The clouding intensity or the degree of darkening at a raised temperature of the molding compound may thus be simply adjusted via the amount of the second compound in the whole molding compound. Through the use of a plastics base, in particular the mechanical and electrical properties of the molding compound can be easily adjusted. It can, for example, be made weather-resistant, resistant to chemicals, or scratch-resistant through the addition of suitable additives or its flowing or sliding properties can be modified. In this way, the manufacture of impact resistance modified glass is possible.

The molding compound according to the invention can be forcibly mixed by compounding, for example in a kneader or an extruder, or be polymerized as a diblock or multiblock copolymer. Its processing into any kind of molded part is possible by means of all the standard thermoforming processes, such as injection molding, multicomponent injection molding, injection blow molding, extrusion. By this means, connecting the molding compound in the form of films or sheets or fibers to other materials is also possible, or laminating of the molded parts or coinject or coating or varnishing.

With the molding compound according to the invention, therefore, all the shapes possible with known processing techniques for thermoplastic materials may be manufactured.

If the refractive index of the second component alters strongly at a specific clouding temperature, a kind of optical switch or switching effect can be achieved. Such switching effects can be particularly simply achieved in that the second component has in the relevant temperature range a phase transition, for example a transition glass/melt or solid/liquid. Since the two components are thermodynamically incompatible, the microphases of the two components also remain stable and separated in the melt or the glass. Thus there is a spontaneous particularly strong clouding at the phase transition temperature. This clouding temperature may be adjusted through appropriate choice of component B and may be adapted to the respective application purpose of the thermotropically transparent molding compound. In a plurality of successive arising phase transitions, the clouding of the whole system can be constantly guided with the temperature.

A plurality of successive phase transitions can be achieved in particular with cladded core block copolymers having at least two phase separated shells with different conversion temperatures.

The molding compound has advantageously 1 to 99 wt % of the first component, 99 to 1 wt % of the second component and if necessary further additives with a weight proportion of 0 to 50 wt %, the shares being so selected that altogether 100 wt % is produced. Advantageously, the share of the first component is between 50 and 99 wt %, preferably between 70 and 99 wt %.

The first component consists advantageously of one or more polymers which are compatible with one another, such that the matrix of the molding compound can be adjusted at will between the properties of a transparent rubber and those of a transparent glass. The second component also consists advantageously of one or more polymers which are compatible with one another. This polymer can, for example, be simultaneously an impact resistance modifier, such that the mechanical properties of the molding compound are improved. If the molding compound consists in this way of a two-phase polymer system, according to the volume ratios of the two components different morphologies can be produced. Thus, for example, with a volume share of 1:30% of the second component a structure can be created in which beads of the second component are present in a matrix of the first component. With a volume share of 1:30% of the first component, on the other hand, beads of the first component are present in a matrix of the second component.

The first and the second components can also be produced as diblock or multiblock copolymers. In this way additional morphologies are possible. For example, with a volume ratio between the first and the second of 70:30 or 30:70, cylindrical structures are formed which are embedded in the respective matrix polymer. The cylinder diameter is here dependent on the molecular weight of the polymer block forming the cylinder. It is usually between 1 and 100 nm. With a mix volume ratio of 50:50, microlayers are produced having thicknesses of between 10 and 100 nm, which are disposed alternately in lamellar fashion in the cross-section. In order to bring these micro-structures into light-scattering active sizes, the first and the second components can be compounded in the same volume ratio as homopolymers into these block copolymers.

The second component has advantageously a light-scattering active size of more than 100 nm, preferably more than 300 nm.

For the first component, the following plastics materials are suitable: transparent rubbers, PVC, PC, PMMA, PS, polyesters, cycloolefins, preferably transparent polyamides, copolyamides or polyurethanes or copolymers or mixtures thereof.

For the second component, the following plastics materials are suitable: transparent polymers, copolymers or block copolymers or mixtures thereof from the monomers vinylacetic esters, methacrylic acid esters, acrylonitrile, glycidyl, styrene, alpha-methylstyrene, norbornene, methylene, propylene, butylene, isoprene, butadiene, n-butene, silane, siloxane, isophthalic acid, terephthalic acid, diolene, diamines, amino carboxylic acids, dicarboxylic acids, hydroxycarboxylic acids or diisocyanates. In particular, through the use of copolymers or through the copolymerization forming the block, the course of the refractive indices and the phase transition temperatures of the second components can be suitably adjusted.

Through the plastics materials mentioned, furthermore, the mechanical properties, for example the impact resistance, notch-impact resistance, alternating bending strength as well as temperature resistance can be improved, such that the manufacture of types of glass which are also breakproof below −40° C. is possible.

Particularly advantageously, the second component consists of copolymers, block copolymers and/or multiblock copolymers of styrene butadiene, styrene isoprene, styrene butadiene acrylonitrile, preferably terpolymers of copolymers, block polymers, multiblock copolymers of ethylene acrylic acid ester glycidyl methacrylate, ethylene glycidyl methacrylate or mixtures thereof. Suitable terpolymers of this kind are for example Lotader GMA or AX types from Elf Atochem, preferably methacrylate butadiene styrene block or multiblock copolymers such as for example the Paraloid types from Rohm and Haas, in particular Paraloid B types such as Paraloid BTA753 for Grilamid PR-TR 55 of EMS-Inventa AG.

If the second component consists of a copolymer of two monomers, in particular a monomer with a lower refractive index and a monomer with a higher refractive index than the refractive index of the first component can be selected. Through the appropriate adjustment of the weight ratios of the two monomers in the copolymer, the refractive index of the second component in the transparent temperature range can be exactly adjusted to the refractive index of the first component, which produces particularly good transparency.

The second component can, furthermore, have grafted groups for phase adhesion of the first component, by which means improved coupling between the two non-miscible components can be achieved. A grafted group of this kind can consist for example of maleic anhydride.

The two components can, furthermore, be colored individually or together, in order to achieve particular color effects. These can also be phase-specific through corresponding coloring of the individual components. The coloring can take place during the compounding or also later.

The molding compound according to the invention can be shaped with any, otherwise known methods for molding thermoplastic materials such as sandwich injection molding processes, injection molding, multicomponent injection molding, injection blow molding, extrusion or extrusion blow molding for example into sheets, films, or fibers. It can then be used as breakproof glass, as laminating film, hot-melt adhesive film or aperture adhesive for glazing or for shading systems for building glazing, vehicle glazing, greenhouse glazing, areas used for agricultural purposes by covering, for spectacle lenses or for the coating of spectacle lenses, as a color effect coating, for traffic and informatory signs, for temperature sensing strips, solar collectors, photovoltaic installations, packaging, lampshades or also coverings for lights.

Lampshades or light coverings can thus be, for example, transparent in the switched-off state, by which means a quick visual check and maintenance of the lights or lamps in the switched-off position is possible. Agricultural grounds can be protected from drying out during great heat with the covering according to the invention, on the one hand, and, on the other hand, the ground temperature can be regulated by shading.

The thermotropically transparent molding compound can also serve for displaying or for covering legible information or pictograms. To this end, either the legible information is written with the molding compound on a carrier, such that the information is legible above a certain temperature, when the molding compound becomes cloudy, or a molding compound can be applied as a covering over legible information, whereby the information only becomes legible below a specific temperature, below which the molding compound becomes transparent. These molding compounds are therefore suitable for temperature-dependent data carriers or also for information boards to be read on both sides, as well as for thermal control systems for optical data transmission. Such temperature-dependent data carriers can also be written on reversibly by heating or also cleared. To this end, the molding compound can, for example, be heated by means of laser beams, and can be written on or painted very clearly. As soon as the regions which have bean warmed in certain parts cool down again, the picture or information disappears again. The molding compound, for example a disc, is then completely transparent again. Consequently, reversible and temporary inscription is possible with heat.

Naturally the thermotropic molding compound can also be further improved by an application of one or more layers of lacquer, for example to increase the scratch resistance, the resistance to chemicals or the transparency. Suitable lacquer finishes may be used for additional decorative effects.

A few sample embodiments of the present invention are described below.

EXAMPLE 1

The first component was produced in otherwise known manner through a polycondensation method with bis-(2,2-dimethylcyclohexylamine)methane, dodecanedioic acid and standard additives for this process. On conclusion of the reaction, the polymer melt was removed, granulated and dried.

A crystal-clear, transparent, amorphous polyamide was produced with a light transmission of 92% at a thickness of 3 mm and a transition temperature between glass/melt Tg of 153° C. and a refractive index of 1.509.

The granulate was processed on standard injection molding machines at a mass temperature of 260° C. to 290° C. and a mold temperature of between 40° C. and 60° C. to form sheets with outer dimensions of 100 mm×100 mm×4 mm.

The transmission of these sheets was then determined at 560 nm with a UV spectrometer. To this end, the sheets were heated up at a rate of 10° C. per minute and a transmission measurement was carried out at intervals of 10° C. Until the glass transition temperature was reached, there was no alteration in the light transmission (see Table 1, Example 1).

EXAMPLE 2

A transparent, reversible thermotropic molding compound according to the invention was manufactured. For this purpose, as the first component the polyamide of Example 1 with a refractive index of 1.509 was used in a share of between 99 and 70 wt %. The second component, which also had a refractive index of 1.509, consisted of Lotader AX 8840 with a complementary share to the first component of between 1 wt % and 30 wt %. Both components were compounded on standard single-screw or twin-screw extruders with mass temperatures of 260° C. to 300°C. The strands were cooled in the water bath. There followed granulation and drying for 12 hours at 80 to 100° C. in the vacuum dryer. Again sheets with outer dimensions of 100 mm×100 mm×4 mm were produced from the granulate as depicted in Example 1, and then the transmission of the sheets was determined in a corresponding manner.

The results of this transmission measurement are summarized in Table 1. The first component (polymer A) shows within the measured temperature range no alteration in the light transmission (see Example 1) while, with the addition of polymer B in an increasing amount, clear darkening effects are measured even at lower temperatures. The transition times are low, the clouding runs parallel to the sample temperature. In cooling, this process runs the other way round, however slightly delayed, up to the initial transmission. With an increasing amount of the second component (polymer B), the thermotropic effect increases. With a weight proportion of 9 wt % polymer B, as described in the fourth column, at 4 mm wall thickness, complete darkening of the sheet takes place spontaneously at 80° C. already. After cooling to room temperature, the light transmission rises again to the initial value. The slowness of this alteration in the light transmission here only depends on the time which the sheet needs for the heat adjustment and not on the speed of diffusive transport processes.

The glass transition temperature of the molding compound according to the invention remains stable in the range examined (up to 20 wt % polymer B), while the notch-impact resistance and the dynamic strength (alternating bending cycles) can be clearly increased.

EXAMPLE 3

As the first component, a crystal clear, transparent, amorphous copolyamide with a light transmission of 90% at 3 mm thickness and a glass transition temperature of 65° C., as well as a refractive index of 1.538 was produced. Manufacture took place here by means of an otherwise known polycondensation method of 39.2 wt % bis-(2,2-dimethyl-cyclohexylamine) methane, 26.8 wt % isophthalic acid and 34 wt % laurinlactam as well as standard known additives for the process. On conclusion of the reaction, the polymer melt was removed, granulated and dried.

The granulate was processed on standard injection molding machines at mass temperatures of between 260° C. and 290° C. as well as a mold temperature of between 40° C. and 60° C. to form sheets with outer dimensions of 100 mm×100 mm×4 mm.

In the measurement of the transmission of the sheets, this copolyamide does not show any clouding in the temperature range between 20° C. and 300° C.

EXAMPLE 4

The copolyamide of Example 3 is extruded with 30 wt % polyamide 12 (Grilamid L25 from EMS-Inventa AS) and 9 wt % Paraloid BTA753 at 280° C., granulated and dried. The copolyamide of Example 3 may here be mixed in one phase with polyamide 12, if strong shearing forces are used, and this mixture forms the first transparent component.

Paraloid BTA 753 as the second component has a refractive index of around 1.538. It contains grafted maleic anhydride groups which react during compounding with the copolyamide. The glass transition temperature of the thermotropic molding compound was between 100° C. and 110° O.

The granulate was processed on standard injection molding machines at a mass temperature of between 250° C. and 280° C. as well as a mold temperature of between 40° C. and 60° C. to form sheets with outer dimensions of 100 mm×100 mm×4 mm.

If the sheets are heated to 70° C., clear clouding is produced. With further heating of the sheet to 120° C., the molding compound softens and forms a cloudy melt. This is an indication of the fact that the clouding has not been caused by microcracks as a result of differing thermal expansion of the individual phases which are not mixed with one another. If the molding compound according to the invention is cooled to room temperature again, the original transparency is obtained again.

TABLE 1

| Example | 1 | 2A | 2B | 2C | 2D | 2E |
|---|---|---|---|---|---|---|
| Polymer A (wt %) | 100 | 98 | 95 | 91 | 85 | 80 |
| Polymer B (wt %) | 0 | 2 | 5 | 9 | 15 | 20 |
| Density (g/ccm) | 1.00 | 0.998 | 0.997 | 0.995 | 0.991 | 0.988 |
| Glass transition temperature (° C.) | 154 | 153 | 153 | 153 | 153 | 153 |
| Charpy Impact Rt (kJ/m2) | 10 | 13 | 15 | 34 | 45 | 45 |
| Elastic modulus (MPa) | 1450 | 1420 | 1350 | 1250 | 1130 | 1050 |
| Alternating bending strength (Million cycles) Dry | 1.5 | 1.5 | 2 | 5.8 | 6 | 6 |
| Transmission RT 560 nm (%) 4 mm | 85 | 80 | 70 | 55 | 40 | 35 |
| Transmission 30° C. 560 nm (%) 4 mm | 85 | 77 | 65 | 45 | | |
| Transmission 49° C. 560 nm (%) 4 mm | 85 | 75 | 60 | 35 | | |
| Transmission 50° C. 560 nm (%) 4 mm | 85 | 70 | 55 | 20 | | |
| Transmission 60° C. 560 nm (%) 4 mm | 85 | 60 | 40 | 8 | | |
| Transmission 70° C. 560 nm (%) 4 mm | 85 | 50 | 30 | 2 | | |
| Transmission 80° C. 560 nm (%) 4 mm | 85 | 45 | 25 | 0 | | |
| Transmission RT ° C. 560 nm (%) 4 mm after cooling | 85 | 80 | 70 | 55 | | |

What is claimed is:

1. Thermotropically transparent molding compound with at least two components, a first component consisting of transparent plastic material, and a second component consisting of a non liquid-crystalline material which is not thermodynamically miscible with the first plastic material, and the refractive index of the first component is a function of the temperature and the refractive index of the second component is a function of the temperature which is different from the function of the temperature of the first component.

2. Molding compound according to claim 1, wherein the refractive index of the second component alters significantly at a specific clouding temperature.

3. Molding compound according to claim 1, wherein a phase transition of the second component occurs at a clouding temperature.

4. Molding compound according to claim 1, wherein the first component and the second component in the transparent temperature range have the same refractive index.

5. Molding compound according to claim 1, comprising additional components, the additional components comprising at least material selected from the group consisting of: reinforcing agents, colorants, flameproofing agents, lubricants, stabilizers, antioxidants, plasticizers and fillers.

6. Molding compound according to claim 5, wherein the additional components are glass beads, glass fibers and/or polymer fibers.

7. Molding compound according to claim 5, wherein the additional components are isorefractive to the first component.

8. Molding compound according to claim 1, comprising 1 to 99 wt % of the first component, 99 to 1 wt % of the second component and 0 to 50 wt % of additional components.

9. Molding compound according to the claim 8, comprising 50 to 99 wt % of the first component and 1 to 50 wt % of the second component.

10. Molding compound according to claim 1, wherein the first component consists of a polymer or of a plurality of polymers which are compatible with one another.

11. Molding compound according to claim 1, wherein the second component consists of a polymer or of a plurality of polymers which are compatible with one another.

12. Molding compound according to claim 1, consisting of a two-phase polymer system.

13. Molding compound according to claim 12, wherein the first and second component form a diblock copolymer or a multiblock copolymer.

14. Molding compound according to claim 1, wherein the first component is a plastic material selected from the group consisting of: transparent rubbers, PVC, PC, PMMA, PS, polyesters, cycloolefins, transparent polyamides, copolyamides or polyurethanes or copolymers or mixtures thereof.

15. Molding compound according to claim 1, wherein the second component is a plastic material selected from the group consisting of: transparent polymers, copolymers or block copolymers or mixtures thereof from the monomers vinyl chloride, vinylidine chloride, bisphenol A, acrylic acid, methacrylic acid, acrylic acid esters, methacrylic acid esters, acrylonitrile, glycidyl, styrene, alpha-methylstyrene, norbornene, ethylene, propylene, butylene, isoprene, butadiene, n-butene, silane, siloxane, isophthalic acid, terephthalic acid, diols, diamines, amino carboxylic acids, dicarboxylic acids, hydroxycarboxylic acids or diisocyanates.

16. Molding compound according to claim 15, wherein the second component consists of copolymers, block copolymers and/or multiblock copolymers of styrene butadiene, styrene isoprene, styrene butadiene acrylonitrile, terpolymers from copolymers, block copolymers or multiblock copolymers of ethylene acrylic acid ester glycidyl methacrylate, ethylene glycidyl methacrylate or mixtures thereof.

17. Molding compound according to claim 1, wherein the second compound consists of a copolymer of two monomers, one of the monomers having a lower refractive index and one of the monomers having a higher refractive index than the first component.

18. Molding compound according to claim 1, wherein the second component is a cladded core-shell block copolymer with at least two phase-separated shells with different phase transition temperatures.

19. Molding compound according to claim 1, wherein the second component consists of a polymer with grafted groups for phase adhesion of the first component.

20. Molding compound according to claim 19, wherein the grafted group is a maleic anhydride and the first component consists of a polyamide or copolyamide.

21. Molding compound according to claim 1, wherein the disperse phase of the second component has a light-scattering active size of more than 100 nm.

22. Molding compound according to claim 1, wherein the first component and/or the second component is colored.

23. Method for manufacturing a molding compound according to claim 1, comprising forcibly mixing the first and the second components by compounding in a kneader or extruder, or polymerizing as diblock or multiblock copolymers.

24. Method according to claim 23, further comprising shaping the molding compound by injection molding, multicomponent injection molding, injection blow molding, extrusion, or extrusion blow molding, into molded parts.

25. Method according to claim 24, further comprising connecting the molding material to other materials by coinjection on to the other materials or by laminating.

26. A manufactured molded part formed from the molding compound according to claim 1.

27. The manufactured molded part according to claim 26, selected from the group consisting of: breakproof glass, laminating film, hot-melt adhesive film or aperture adhesive for glazing or shading systems, for building glazing, vehicle glazing, greenhouse glazing, for covering areas used in agriculture, for spectacle lenses or the coating of spectacle lenses, color-effect coatings, traffic and informatory signs, temperature sensing strips, for solar collectors, for photovoltaic installations, packaging, for lampshades or coverings for lights.

28. The manufactured molded part according to claim 26 selected from the group consisting of temperature-dependent display or covering of readable information or pictograms, for temperature-dependent data carriers or information boards to be read on both sides, as well as for thermal control systems for optical data transmission.

* * * * *